Figure 1:
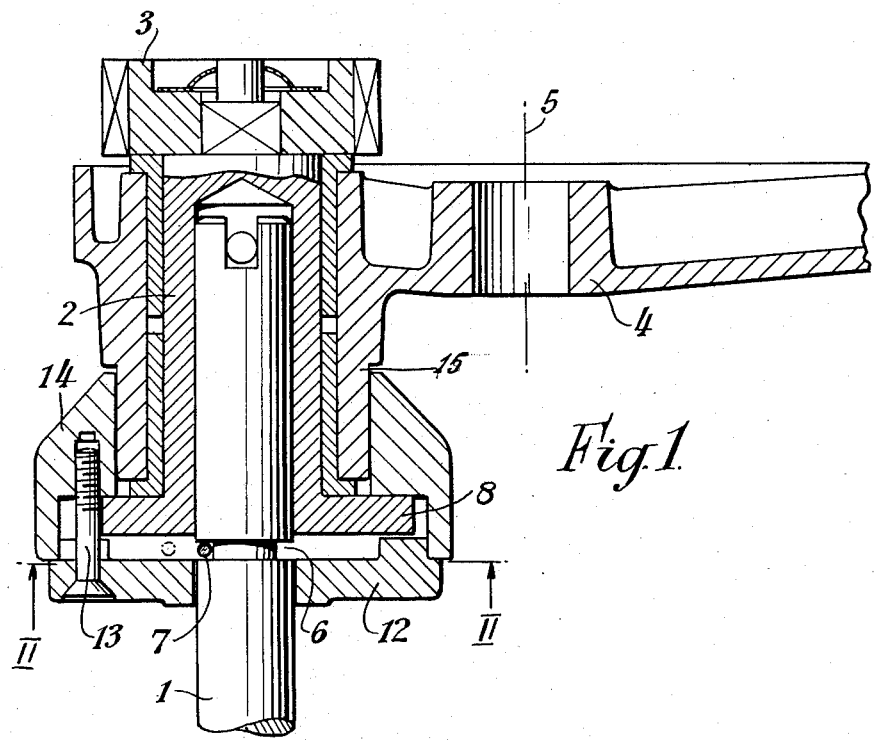

Aug. 13, 1963  P. D. KNIGHT  3,100,661
QUICK RELEASE CATCHES
Filed Dec. 19, 1960

INVENTOR
Peter David Knight
BY
Stevens Davis Miller & Mosher ATTORNEYS

3,100,661
QUICK RELEASE CATCHES

Peter David Knight, Woking, England, assignor to Kenwood Manufacturing (Woking) Limited, Woking, England
Filed Dec. 19, 1960, Ser. No. 76,887
Claims priority, application Great Britain Dec. 29, 1959
4 Claims. (Cl. 287—119)

This invention relates to quick release catches and is primarily concerned with the provision of a catch for use in securing in driving engagement with one another the driving and driven members of a separable drive coupling of the kind having driving and driven members interengageable by relative axial movement.

It is an object of this invention to provide, in a drive coupling of the kind referred to, a quick release catch comprising an abutment surface associated with one of said coupling members and retaining means mounted for pivotal movement in a plane perpendicular to said common axis in one direction under spring action to a retaining position in which said retaining means is engageable by said abutment surface to prevent axial separation of said coupling members and manually in the opposite direction against said spring action to a retracted position clear of the abutment surface to permit disconnection of said coupling members by axial separation thereof.

The retaining means may consist for example of a pivotally mounted member which is resiliently urged into the retaining position so as to be engageable in an annular groove in one of the coupling members when the coupling members are coupled in driving engagement with one another. The said member may consist for example of a spring loaded finger or a lock-type spring movable out of the retaining position by a manually operable member which may be pivotally or rotatably mounted.

Drive couplings of the kind with which the present invention is concerned are frequently used in small power driven domestic appliances for example electrically driven food mixing machines such drive couplings being provided in the beater drive and also for coupling attachments, also power operated, to a power take-off provided on the appliance. Thus the accompanying drawings show by way of example a quick release catch of the present invention incorporated in the beater drive of a food mixing machine.

Figure 2:
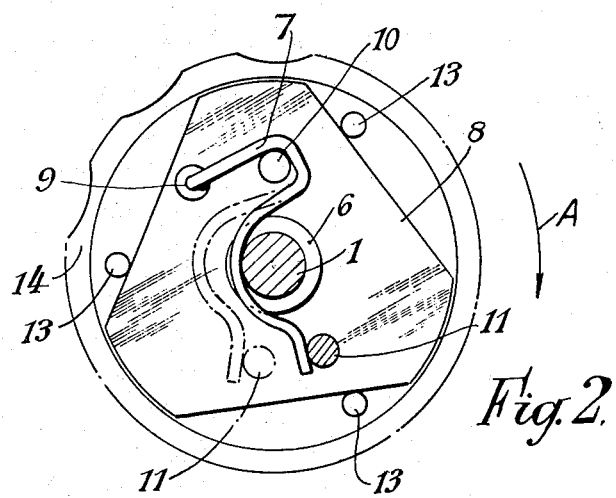

In the drawings:

FIGURE 1 is a view in section of part of the beater drive incorporating the quick release catch; and FIGURE 2 is an underneath plan on the line II—II of FIGURE 1.

The food mixing machine beater drive shown in the drawing is of the kind in which the beater (not shown) is carried on one end of a beater shaft 1 the free end of the beater shaft being insertable in the sleeve portion of a planet shaft 2 driven by the planet pinion 3 keyed to the upper end thereof the pinion 3 being part of a planet gear, the planet shaft 2 being mounted in a planet hub 4 which is itself rotatable about the axis 5. Such planet gear drives are already in use and do not require further detailed description.

In adapting a drive of this kind for the purpose of the invention the beater shaft 1 is provided with an annular groove 6 which is so located in the length thereof that when the beater shaft is inserted in the planet shaft 2 a lock-type spring 7 mounted on the outer face of a flange 8 formed on the outer end of the planet shaft 1 is engageable in the said annular groove 6 such engagement serving to retain the planet and beater shafts axially in position relative to one another.

The lock-type spring 7, preferably a wire spring, is anchored at one end 9 to the flange 8 and passes around a fixed fulcrum pin 10, the length of spring extending beyond the fulcrum pin being curved and providing a portion engageable in the annular groove. The free end of said curved portion extends out of the groove so as to be located on the opposite side of the beater shaft to the fulcrum pin. The spring is therefore normally urged into the annular groove and is withdrawn therefrom by a stop member 11 carried by a disc 12 mounted around the beater shaft beneath the flange of the planet shaft, the said plate being secured by screws 13 to a release ring 14 which is in turn rotatably mounted on a stationary sleeve 15 surrounding the planet shaft and forming part of the planet hub 4 the flange 8 being of substantially triangular plan form to provide clearance for the passage of the screws 13. The stop member 11 projects upwardly from the inner face of the disc 12 so as to be engageable with the projecting end of the lock-type spring 7 when the release ring 14 is rotated in one direction, the said release ring being normally urged in the opposite direction by the lock-type spring. The screws 13 provide stop means for restricting the rotational movement of the release ring each said screw engaging the adjacent edge of the flange 8 at the limit positions of the release ring. Thus overstressing of the lock-type spring is prevented when the release ring is rotated in the direction of arrow A FIGURE 2 to permit withdrawal of the beater shaft from the planet shaft.

I claim:

1. In a drive coupling having two coupling members rotatable about a common axis, a quick release catch comprising means defining an annular groove on one of said members, a fulcrum pin carried by said other member, a length of spring wire looped around said fulcrum pin and having a free end and anchored at a position remote from said free end on the other of said members so that such free end is pivotally movable about said fulcrum pin in a plane perpendicular to said common axis and passing through said annular groove, said spring wire normally engaging in said annular groove to prevent relative axial movement of said members; a release ring mounted coaxially with said members so as to be rotatable about said common axis, and means on said release ring engageable with said spring catch and acting to disengage said spring wire from said annular groove on rotation of said release ring to permit relative axial separation of said members.

2. The quick release catch specified in claim 1, wherein said means on said release ring comprises a disc secured to said ring and a stop member carried by said disc.

3. A separable driven coupling for the beater of a food mixer comprising a hollow planet shaft having a free end, a flange carried at said free end of the planet shaft, a beater shaft mountable on a common axis within said planet shaft, said beater shaft having an annular groove in a position therein to be external to said planet shaft when the beater shaft is mounted in said planet shaft, a fulcrum pin carried by said flange, a spring wire catch also anchored on said flange and looped about said fulcrum pin, a free end portion of said spring wire catch extending beyond said fulcrum pin so as to be pivotally movable about the latter in a plane perpendicular to said common axis so that such free end portion is normally engaged in said annular groove to prevent relative axial separation of said shafts, a release ring mounted rotatably and coaxially around said planet shaft; an annular disc mounted around said beater shaft and secured to said release ring; a stop member carried by said annular disc in a position to engage said spring catch on rotation of said release ring in one direction relative to said planet shaft so as to pivot the spring catch away from the annular groove to permit relative axial separation of the two shafts.

4. In a drive coupling having two coupling members rotatable about a common axis, a quick release catch comprising means defining an annular groove in one of said members, a fulcrum pin carried by said other member, a length of spring wire having one end anchored to said other member, and an opposite free end, an intermediate portion looped around said fulcrum pin so as to be movable only in a plane perpendicular to said common axis and passing through said annular groove in one direction under spring action to a position in which said spring wire is engaged in said annular groove to prevent axial separation of said coupling members, and manually in the opposite direction against said spring action to a position in which said spring wire is disengaged from said annular groove to permit disconnection of said coupling members by axial separation thereof.

References Cited in the file of this patent

UNITED STATES PATENTS

| | | |
|---|---|---|
| 814,020 | Clifford | Mar. 6, 1906 |
| 1,052,077 | McMillan | Feb. 4, 1913 |
| 1,245,939 | Mallatt | Nov. 6, 1917 |
| 1,915,370 | Levy | June 27, 1933 |

FOREIGN PATENTS

| | | |
|---|---|---|
| 708,740 | Germany | July 28, 1941 |